United States Patent [19]

Loeb

[11] 4,025,427

[45] May 24, 1977

[54] REUSABLE WATER SOFTENER SYSTEM FOR CLOTHES WASHER

[75] Inventor: Leopold Loeb, Louisville, Ky.

[73] Assignee: General Electric Company, Louisville, Ky.

[22] Filed: July 16, 1975

[21] Appl. No.: 596,357

Related U.S. Application Data

[62] Division of Ser. No. 417,364, Nov. 19, 1973, Pat. No. 3,937,042.

[52] U.S. Cl. .............................. 210/33; 210/38 A
[51] Int. Cl.² ...................... B01D 15/06; C02B 1/42
[58] Field of Search .......... 68/13 A, 18 FA; 210/30, 210/33, 38 A, 167, 171, 190, 282, 484, 473, 474

[56] References Cited

UNITED STATES PATENTS

| | | | |
|---|---|---|---|
| 1,211,735 | 1/1917 | Magrath | 210/190 |
| 1,547,855 | 7/1925 | Burson | 210/474 |
| 2,087,157 | 7/1937 | Lind | 210/33 |
| 2,091,002 | 8/1937 | Lewis | 210/282 |
| 2,749,307 | 6/1956 | Ellison | 210/282 |
| 2,832,373 | 4/1958 | Scholer | 210/190 |
| 3,027,742 | 4/1962 | Nowicki | 68/18 FA |
| 3,680,703 | 8/1972 | Borochaner | 210/190 |

*Primary Examiner*—Frank A. Spear, Jr.
*Assistant Examiner*—Ivars Cintins
*Attorney, Agent, or Firm*—Frederick P. Weidner; Francis H. Boos

[57] ABSTRACT

A water softening system utilizing a reusable, self-contained water softener device for an agitator type clothes washer. The water softener device includes a quantity of cation exchange resin contained in a torus shaped jacket formed of a closely woven porous, synthetic-fiber fabric. The water softener device is placed in the clothes washer in association with the agitator such that water will be circulated through the resin to effect a hardness reduction thereof by the removal of calcium and/or magnesium ions. After the softening operation, the water softener is removed from the washer and detergent and soiled fabrics are placed therein. The resin is then regenerated by treatment of the device with a salt solution.

3 Claims, 4 Drawing Figures

REUSABLE WATER SOFTENER SYSTEM FOR CLOTHES WASHER

CROSS REFERENCE TO RELATED APPLICATION

This application is a division of copending U.S. patent application Ser. No. 417,364 for "Reusable Water Softener System For Clothes Washer", filed Nov. 19, 1973, now patent No. 3,937,042, in the name of Leopold Loeb, and assigned to the assignee of this application.

BACKGROUND OF THE INVENTION

1. Field of the Invention

The present invention relates to a water-softening system utilizing a reusable, self-contained water softener device and more particularly, to such a water softener device for use in a clothes washer for reducing the hardness of water therein.

2. Description of the Prior Art

Ecological concern has resulted in legislation forbidding the use of polyphosphates as a detergent component in many geographical areas of our country. However, there are many areas of our country where the quality of water, and particularly the hardness, is such that poor clothes washing performance often results from the use of non-phosphate detergents. The generally recommended solution for the problem is the installation of a home water-softening system. This requires a substantial outlay of money on the part of the homeowner or lessor and as a result, people often are disposed to make do with the hard water situation as it is.

By the present invention, there is provided a low-cost means to soften water in agitator type clothes washers.

SUMMARY OF THE INVENTION

In accordance with the present invention, there is provided in a clothes washer having an agitator a water softening system utilizing a reusable, self-contained water softener device. The water softener device comprises a package of cation exchange resins, the package being permeable to water and arranged to be disposed within the clothes washer and associated with the agitator such that water will be circulated through the resin for removing calcium and magnesium ions from the water to effect a reduction of hardness of the water. The resin is of the type which is capable of regeneration by treatment with a salt solution.

It is therefore an object of the present invention to provide a water softening system for use in an agitator type of clothes washer wherein the system is efficient, of low cost and is reusable.

DESCRIPTION OF THE PREFERRED EMBODIMENT

Figure 1:
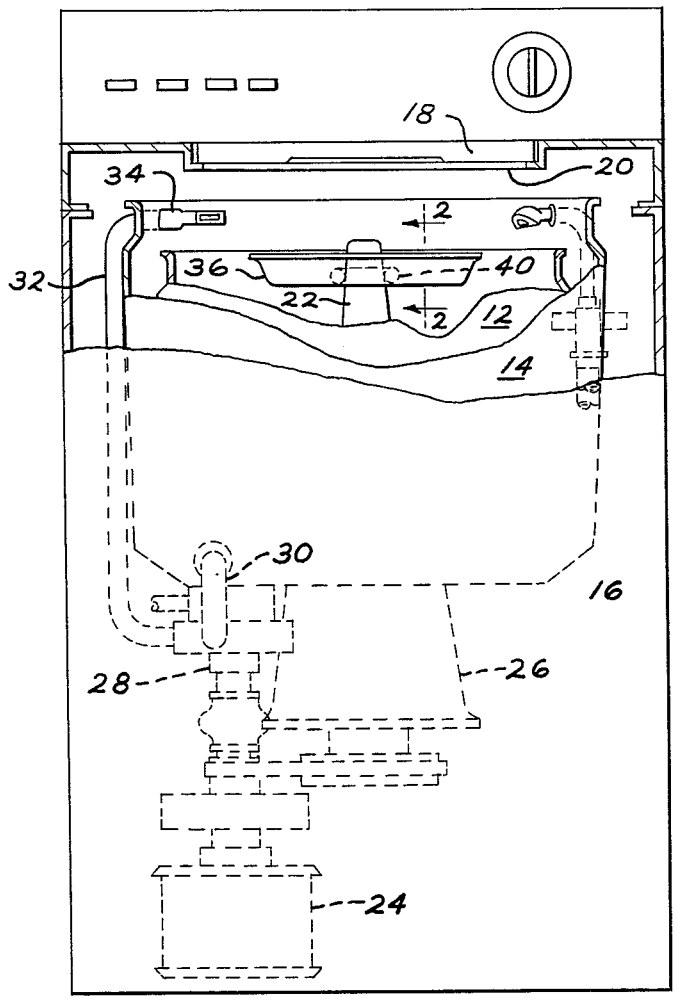
FIG. 1 is a front elevational view of an automatic clothes washing machine incorporating the preferred embodiment of the present invention, the view being partly in section and partly broken away to show certain operating components thereof.

Referring to FIG. 1, there is shown an agitator type clothes washer 10 of the vertical axis type having a conventional, perforated wash basket 12 disposed within an outer, imperforate, liquid-retaining tub 14. With this combination, the basket 12 and 14 form suitable means for containing water and fabrics to be washed in the water. The outer tub 14 is rigidly mounted within an appearance cabinet 16 which includes an access lid or cover 18 hingedly mounted on a hinge rod on the top portion of the cabinet 16 for providing access through an opening 20 to the basket 12.

At the center of the wash basket 12 is positioned an agitator 22 for agitating clothes during a washing operation. Conventionally, the basket 12 is mounted for rotation and the agitator 22 is mounted for some type of oscillatory motion which will effect washing action on the clothes in the basket 12.

Basket 12 and agitator 22 are driven from a reversible motor 24 coupled by suitable means to a transmission 26. When the motor 24 is rotated in one direction, the transmission causes a slow speed oscillation of the agitator 22 and the basket is stationary and when the motor is driven in the opposite direction, the transmission 26 drives both basket 12 and agitator 22 at a high speed for centrifugal extraction of the liquid from the clothes.

In addition to operating the transmission 26 as described, motor 24 provides a direct drive to a pump structure 28. During the high speed operation, pump 28 draws liquid from the outer tub 14 and discharges it through a conduit (not shown) and thence to a household sewage disposal system. During wash or slow speed when the agitator 22 is oscillating, the pump 28 draws liqud in through conduit 30 and discharged through conduit 32 which extends up to and terminates at a nozzle 34 opening into basket 12. This then constitutes a water recirculation system for the washer 10. Water expelled from nozzle 34 then passes into a filter pan 36 suitable mounted on agitator 22, the filter pan being provided with a central hub having a circular cross section for telescoping over and mating with the agitator center post which has a complementary configuration to drivingly engage the filter pan and thereby impart oscillatory motion to the filter pan simultaneously with the agitator.

In accordance with the present invention, in a preferred embodiment thereof, there is provided a reusable, self-contained water softener device denoted generally as 40 in the drawings. Water softener device 40 has been formed in the shape of a torus or doughnut for placement over the central hub of the filter pan 36 such that it may rest against the bottom portion of the filter pan. In such an arrangement, water being expelled through the recirculation process from nozzle 34 will pass onto and through water softener device 40 (as shown in FIG. 1) to effect softening of the water in outer tub 14.

Figure 2:
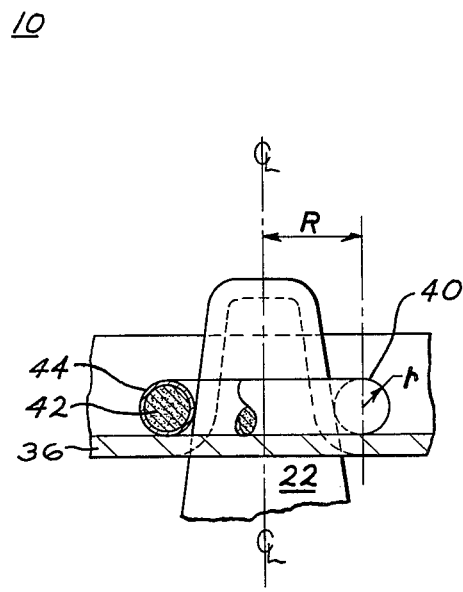
FIG. 2 is a view taken generally along the lines 2—2 of FIG. 1 partly broken away and partly in section.

The water softener device 40 includes a package of cation exchange resins 42 as seen in FIG. 2 such as, for example, strongly acidic resins. These resins are sold commercially by Rohm & Haas Company under the trade names Amberlite IR120 and Amberlite IR200, and by Dow Chemical Company under the trade names Dowex 50 and Dowex 50W. Such resins normally have a capacity in the order of about 30,000 grains of hardness as calcium carbonate ($CaCO_3$) per cubic foot. The resin 42 is contained in a package or jacket 44 formed of a closely-woven, porous, synthetic-fiber fabric. This allows water to pass through the jacket but retains the small, bead-like particles of resin therewithin.

In normal operation, an automatic washer such as shown in FIG. 1 has a wash-fill water volume of about 22 gallons. For most water supplies, a reduction of 15 grains of hardness per gallon would be sufficient to allow for good wash performance. When using a strong acid, cation exchange resin, such as Amberlite IR200, the total resin requirement would be approximately 20 cubic inches to effect such a hardness reduction, if proper contact between the resin and water can be achieved. To provide 20 cubic inches of resin then, dimensions (see FIG. 2) of the torus shaped jacket 44 found suitable are:

$r = 0.69$ inches,
$R = 2.14$ inches.

The inside diameter of the torus would then be approximately 2.9 inches.

The operational sequence, assuming fully regenerated resin is as follows:

1. Place water softener device 40 on the hub of filter pan 36 and washer 10 is filled with fresh water in the normal manner.
2. Start agitation with water recirculation and allow to continue for up to 15 minutes.
3. Stop machine and remove water softener 40.
4. Add detergent and soiled fabrics and proceed through normal wash, rinse and spin cycles.

In effect, then calcium and magnesium ions, the main contributors to hardness in water, have been removed by the resins in a manner well known to those skilled in the art. The water softener device 40 and particularly the resins 42 therein should then be regenerated as will be discussed later.

Figure 3:
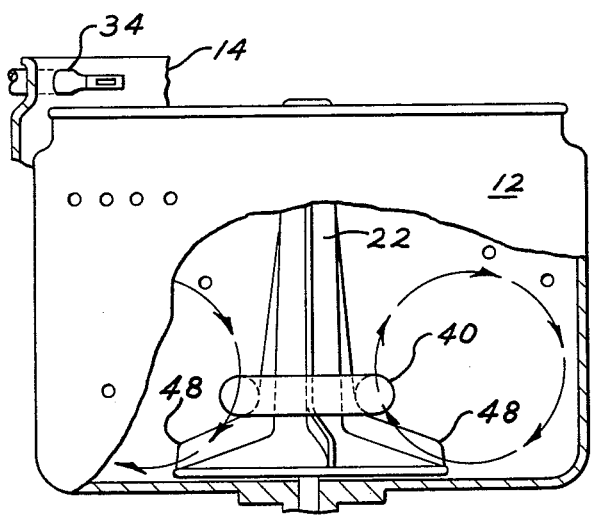
FIG. 3 is a front elevational view of certain portions of an automatic clothes washing machine broken away to more clearly show an alternate placement of the preferred embodiment of the present invention.

Referring now to FIG. 3 there is shown an alternate arrangement for effecting water softening in an agitator type clothes washer 10. A water softener device in the form of a package of cation exchange resins is also provided, but is placed over the shaft of the agitator 22 to come to rest thereon at a point where the flared surfaces 48 commences. The package may again be in the form of a torus but it is not limited to such a shape. In such an application then, advantage is taken of the water motion in basket 12 and therefore tub 14 created by the oscillatory action of agitator 22 as shown by the arrows, and much as described and shown further in U.S. Pat. No. 1,704,932—Altorfer. Water in the machine then is effectually passed through the resin 42 of water softener device 40 in a continuous fashion to effect removal of calcium and magnesium ions, if present, therefrom. This process is performed in the aforementioned fashion, the water softener device 40 being removed from the washer 10 before the placement of detergent and soiled fabrics therein. Of course, in such an application the dimensions of the package or jacket 44 will have to be changed to accommodate the dimensions of the agitator and particularly those at the lower portion thereof.

Regeneration of such a water softening device is accomplished by placing the exhausted resin package in a solution of sodium chloride in water. However, simple immersion of the exhausted resin in a salt solution cannot be expected to be of high efficiency since the displaced calcium and/or magnesium ions remain within the solution to compete with the sodium ions for sites on the resin matrix. Ideally, the displaced calcium and any magnesium ions should be removed from the solution as rapidly as possible after they are evolved thus allowing the regeneration reaction shown below to proceed more nearly to completion:

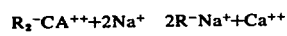

where R is the resin matrix.

Figure 4:
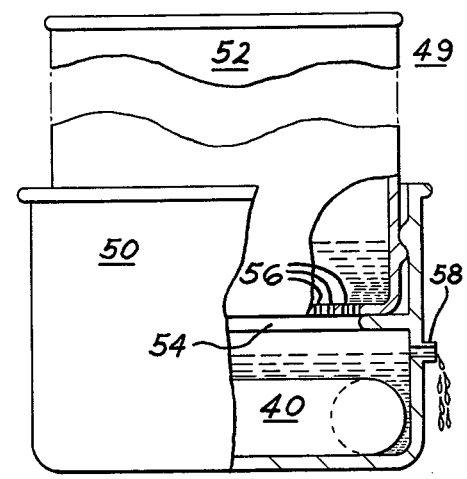
FIG. 4 is a front elevational view partly in section and partly broken away of a regenerating device for regenerating the water softener resin of the present invention.

A more complete regeneration than simple immersion may be obtained by using the special purpose regeneration device or vessel 49 shown in FIG. 4. The exhausted resin package or water softener device 40 is placed in a container such as the lower compartment 50 of a two compartment vessel 49. The upper compartment 52 is then fitted into the lower compartment 50 coming to rest against an annular platform 54 mounted within the lower compartment. A regenerating solution as a result of mixing one quarter pound of sodium chloride to a gallon of water is then added to the upper compartment. The base of upper compartment 52 is provided with a plurality of small orifices 56 constituting a means for automatically supplying the regenerating solution to the lower compartment 50. The rate of flow of the sodium chloride solution through the orifices should be such that the rate of flow will effectively cause the calcium and any magnesium ions on the resin matrix to be replaced by sodium ions. The size and quantity of orifices 56 should be such that delivery of the 1 gallon of salt solution to the lower compartment 50 containing approximately 20 cubic inches of resin will take from 1 to 2 hours. Lower compartment 50 is fitted with an overflow drain 58 in a side wall thereof at a level sufficiently high to allow for total immersion of the water softener device 40. Drain 58 then constitutes means for automatically removing evolved calcium ions from the container.

Regenerating vessel 49 including upper compartment 52 and lower compartment 50 may be molded from high density polyethylene since they will be exposed only to aqueous salt solutions at room temperature.

Although the water softener device disclosed herein has been provided with a package formed generally in the shape of a torus, this is not absolute and there are in fact many forms which the package may take which will allow, in an agitator type clothes washer, for the suitable passage of water through the resins for effecting a reduction in hardness thereof. Likewise the regenerating device and particularly the means for automatically supplying the regeneration solution and the means for automatically removing evolved ions may take other forms readily obvious to those skilled in the art.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:

1. The method of softening water for a clothes washer having a tub, an agitator, a pump to draw liquid from the tub, and a conduit connected to the pump for selectively returning liquid to the tub comprising the following steps;

a. placing a package of cation exchange resin, the package being permeable to water, into the tub and around the agitator,
b. introducing water into the tub,
c. operating the agitator and pump whereby water will be circulated through the resin by means of said pump and conduit for removing calcium and magnesium ions from the water to effect a reduction of hardness of the water,
d. removing the package of cation exchange resin from the tub,
e. placing the package of cation exchange resin in a container,
f. supplying regenerating solution to the container to immerse the package and at a rate sufficient to effect replacement of calcium ions on the resin by sodium ions, and
g. removing the solution carrying evolved calcium ions from the container while maintaining the package immersed.

2. The method of softening water for a clothes washer as recited in claim 1, wherein the step of supplying the regenerating solution includes dripping the solution into the container by means of a tank having a plurality of small orifices in the base thereof.

3. The method of softening water for a clothes washer as recited in claim 1, wherein the step of placing the package of cation exchange resin into the tub follows the step of introducing water into the tub.

* * * * *